United States Patent [19]
Haardt et al.

[11] Patent Number: 5,180,628
[45] Date of Patent: Jan. 19, 1993

[54] SHOCK-ABSORBING PROPYLENE POLYMER COMPOSITE MOLDINGS

[75] Inventors: Udo Haardt, Biblis; Erhard Seiler, Lugwigshafen; Hermann Tatzel, Weinheim; Harald Schwager, Speyer; Friedrich Domas, Altlussheim, all of Fed. Rep. of Germany

[73] Assignee: BASF Aktiengesellschaft, Ludwigshafen, Fed. Rep. of Germany

[21] Appl. No.: 822,263

[22] Filed: Jan. 17, 1992

[30] Foreign Application Priority Data

Jan. 23, 1991 [DE] Fed. Rep. of Germany ....... 4101806

[51] Int. Cl.$^5$ .............................. B32B 3/00; B32B 3/18
[52] U.S. Cl. ..................................... 428/215; 264/321; 428/316.6; 428/318.6; 428/317.9; 428/319.7; 428/319.9
[58] Field of Search .................. 428/215, 316.6, 318.6, 428/317.9, 319.7, 319.9; 264/321

[56] References Cited

U.S. PATENT DOCUMENTS

| | | | |
|---|---|---|---|
| 2,976,577 | 3/1961 | Gould | 428/319.7 |
| 3,411,967 | 11/1968 | Rowland et al. | 156/79 |
| 3,637,458 | 1/1972 | Parrish | 428/314.2 |
| 4,374,885 | 2/1983 | Ikeda et al. | 428/316.6 |
| 4,721,643 | 1/1988 | Harayama et al. | 428/318.6 |
| 4,913,944 | 4/1990 | Gilman, Jr. | 428/318.6 |
| 5,075,162 | 12/1991 | Okubo et al. | 428/319.7 |
| 5,122,398 | 6/1992 | Seiler et al. | 428/319.7 |

FOREIGN PATENT DOCUMENTS

| | | |
|---|---|---|
| 0097504 | 1/1987 | European Pat. Off. |
| 0231013 | 8/1987 | European Pat. Off. |
| 3100682 | 11/1981 | Fed. Rep. of Germany |
| 2067135 | 7/1981 | United Kingdom |
| 2214868 | 9/1989 | United Kingdom |

Primary Examiner—William J. Van Balen
Attorney, Agent, or Firm—Keil & Weinkauf

[57] ABSTRACT

A shock-absorbing propylene polymer composite molding contains a. a layer with a thickness of from 0.5 to 10 mm which contains a propylene polymer having a melting point of from 130° to 165° C., b. an intermediate layer with a thickness of from 0.05 to 0.5 mm comprising a hot-melt adhesive based on an olefin copolymer having a melting point of from 90° to 140° C., c. a foam layer with a thickness of from 3 to 200 mm and a density of from 0.015 to 0.1 g/cm$^3$ based on a propylene copolymer having a melting point of from 125° to 155° C., d. an intermediate layer with a thickness of from 0.05 to 0.5 mm comprising a hot-melt adhesive based on an olefin copolymer having a melting point of from 90° to 140° C., e. a layer with a thickness of from 0.5 to 10 mm which contains a propylene polymer having a melting point of from 130° to 165° C.

2 Claims, No Drawings

SHOCK-ABSORBING PROPYLENE POLYMER COMPOSITE MOLDINGS

The present invention relates to shock-absorbing composite moldings based on polypropylene polymers, comprising a propylene polymer foam laminated on both sides with a propylene polymer using a hot-melt adhesive layer which bonds the outer layers to the foam.

As is known, foams made from propylene polymers have a high shock absorption capacity. Their unsatisfactory surface means that moldings produced therefrom have nevertheless not yet been used as visible parts in the exterior and interior of motor vehicles.

EP-B 97 504 describes the use of foams made from propylene polymers as the core material for automobile bumpers. It is stated that the core material is used in combination with an outer covering, for example made of polypropylene; however, no concrete example is given of the production of a composite molding.

It is the object of the present invention to develop composite moldings which can be used for fitting out motor vehicles and, in contrast to the parts used hitherto, for example made of polyurethanes, can be recycled. They should also comprise similar, mutually compatible, meltable and thus recyclable plastics. They should be durable and at the same time shock-absorbing, and should have good mechanical properties and high surface quality.

We have found that these objects are achieved by composite moldings based on propylene polymers and comprising a foam core which is bonded on both sides to fully or substantially compact polymers by means of a hot-melt adhesive layer.

The present invention accordingly provides shock-absorbing propylene polymer composite moldings containing a. a layer with a thickness of from 0.5 to 10 mm which contains a propylene polymer having a melting point of from 130° to 165° C.,
b. an intermediate layer with a thickness of from 0.05 to 0.5 mm comprising a hot-melt adhesive based on an olefin copolymer having a melting point of from 90° to 140° C.,
c. a foam layer with a thickness of from 3 to 200 mm and a density of from 0.015 to 0.1 g/cm$^3$ based on a propylene copolymer having a melting point of from 125° to 155° C.,
d. an intermediate layer with a thickness of from 0.05 to 0.5 mm comprising a hot-melt adhesive based on an olefin copolymer having a melting point of from 90° to 140° C.,
e. a layer with a thickness of from 0.5 to 10 mm which contains a propylene polymer having a melting point of from 130° to 165° C.

The present invention furthermore provides a process for the production of polypropylene composite moldings of this type which comprises, in a mold which does not close in a gas-tight manner, filling the space between layers a) and b) on the one hand and d) and e) on the other hand, which are matched to the shape of the mold walls, with particles of the foam c) having a mean diameter of from 2 to 8 mm, and heating the particles in this space by introducing steam or hot air in such a manner that they expand and weld to one another, and which comprises melting the intermediate layers b and d and simultaneously welding them to layers a, c and e.

The core layer c) of the novel composite moldings comprises a foam based on a propylene copolymer. This layer has a thickness of from 3 to 200 mm, preferably from 4 to 100 mm, in particular from 5 to 20 mm. The density is from 0.015 to 0.1 g/l, preferably from 0.02 to 0.08 g/l, in particular from 0.025 to 0.06 g/l. Preference is given to copolymers of propylene with from 1 to 30% by weight, in particular from 1 to 6% by weight, of ethylene and/or a C$_4$-to C$_5$-α-olefin. The copolymer should have a melting point of from 125° to 155° C., preferably from 130° to 150° C., in particular from 140° to 150° C. The melting point here is the maximum, determined by the DSC method, for the second re-melting of a sample (crystallite melting point). This determination method is also used to determine the melting points of the other components of the composite moldings.

The foam is a particle foam, as obtainable by welding foam particles having a mean diameter of from 2 to 8 mm, preferably from 3 to 6 mm. The core layer gives the composite molding the favorable shock-absorbing properties.

The outer layers a) and e) of the novel composite moldings essentially comprise at least one propylene polymer, either a homo- or a copolymer. The propylene polymers should have a melting point of from 130° to 165° C., preferably from 140° to 165° C., in particular from 150° to 165° C. The melting point of the outer layers should be at least 5° C., preferably more than 10° C., above the melting point of the propylene copolymer of the core layer c). The outer layers have a thickness of from 0.5 to 10 mm, preferably from 0.8 to 5 mm.

The outer layers may have any desired surface structure, for example grain structure.

The outer layers may, in addition to the propylene polymer, contain conventional additives in effective amounts, such as dyes, pigments, fillers, reinforcing agents, stabilizers, antistatics, lubricants, plasticizers, elasticizers or the like.

The upper outer layer a) (visible layer) is preferably elastified, for example through the use of a mixture of a propylene polymer rigid phase comprising highly isotactic, partially crystalline polypropylene, which may contain up to 3% by weight of ethylene units, and a soft phase comprising an ethylene-propylene rubber containing from 30 to 70% by weight of ethylene. Two-phase propylene polymers of this type, which may be partially crosslinked, are known commercial products and are prepared by the known processes of stepwise propylene and ethylene-propylene polymerization, preferably by gas-phase polymerization. The rigid phase:soft phase ratio can vary between 90:10 and 30:70.

The propylene polymers can also contain, as elasticizers, conventional hydrogenated or non-hydrogenated styrene-diene elastomers, ethylene-propylene-diene rubbers (EPDM), dynamically vulcanized propylene-/EPDM blends and linear low-density ethylene copoylmers (LLDPE and VLDPE).

The outer layer e) is generally the supporting layer of the composite molding and should therefore expediently have a rigidity corresponding to the service requirements, for example through the use of highly isotactic polypropylene. If a proportion of rubber, for example an ethylene-propylene rubber, is admixed with the polymer in order to improve the low-temperature impact strength, this proportion should only be about 5 to 30% by weight. Fillers, such as talc, chalk, graphite, kaolin or wollastonite, and/or reinforcing agents, such as short glass fibers, are preferably admixed with the polymer in order to increase the rigidity. The layer can also be reinforced by means of long glass fibers or glass fiber mats. The filler or reinforcing agent is generally used in an amount of from 10 to 60% by weight, based on the layer.

The intermediate layers b) and d) of the novel composite moldings serve to bond the outer layers to the foam core. They have a thickness of from 0.05 to 0.5 mm, preferably from 0.05 to 0.2 mm and comprise an olefin copolymer acting as a hot-melt adhesive and are preferably built up from more than 50% by weight of ethylene and/or propylene and, in addition, another α-olefin or vinyl acetate, vinyl propionate, (meth)acrylic acid, a (meth)acrylate of an alcohol having from 1 to 8 carbon atoms or other polymerizable monomers. Terpolymers comprising from 85 to 95% by weight of propylene, from 2 to 10% by weight of ethylene and from 2 to 8% by weight of a $C_4$-$C_6$-α-olefin are particularly suitable. The melting point of the olefin copolymer should be from 90° to 140° C., preferably from 100° to 135° C., in particular from 110° to 130° C. The melting point should be at least 5° C., preferably at least 10° C., below the melting point of the propylene copolymer of the core layer c).

The novel composite moldings are advantageously produced starting from particles of the foam of the type described under c) having a mean diameter of from 2 to 8 mm, in particular from 3 to 6 mm. The particle diameter should generally be not greater than from 50 to 65% of the desired foam core thickness. The particles are then introduced, in a mold which does not close in a gas-tight manner, into the space between layers a) and b) on the one hand and c) and d) on the other hand, which are matched to the shape of the mold walls, for example using compressed air. Steam or hot air is subsequently passed into this space, preferably from the side or possibly through appropriate perforations in the outer layers, heating the particles in such a manner that they soften, expand and weld to one another, the intermediate layers b) and d) melting and simultaneously welding the foam core c) to the outer layers a) and e). After the cooling, the molding is removed from the mold.

In a preferred procedure, a prefabricated composite of layers a) and b) is sucked into the female mold under reduced pressure at from 130° C. to 200° C. Immediately thereafter, the male mold with the prefabricated composite, matched to the shape of the mold wall, of layer e) and the laminated layer d) is combined with the female mold in such a manner that a space a few millimeters larger than the desired foam layer remains between the halves of the mold. The space is subsequently filled with the foam particles and then heated with steam or hot air, and the mold halves are pressed together to the final dimensions before or during the heating. During this operation, the foam particles are compressed and weld to one another and to the outer layers to form the finished molding.

The novel composite moldings may also contain, in their individual layers, conventional additives, such as dyes, pigments, fillers, reinforcing agents, flameproofing agents, release agents, antistatics, stabilizers and other assistants in effective amounts.

The novel composite moldings are preferably used in the production of motor vehicles, for example as door panels, dashboards, consoles, sun visors, bumpers, spoilers and the like.

The construction of the novel composite moldings from substantially similar types of material makes virtually type-pure recycling without separation into the individual components possible.

EXAMPLE 1

Structure of a bumper composite component Layer a)

Blend comprising 55% by weight of polypropylene and 45% by weight of ethylene-propylene rubber (weight ratio 1:1), prepared by stepwise polymerization of propylene and of a 1:1 mixture of propylene and ethylene (commercial product, Novolen 2900 HX from BASF AG), with subsequent aftertreatment with a small amount of a crosslinking agent.

Melting point of the rigid phase 162° C., MFI (230° C.), 2.16 kg)=1.2 g/10 min, layer thickness=1.8 mm.

Layer b)

Random terpolymer comprising 92% by weight of propylene, 2% by weight of ethylene and 4% by weight of 1-butene.

Melting point 132° C., MFI (230° C., 2.16 kg)=5.5 g/10 min, layer thickness=0.2 mm.

Layer c)

Foam made from a random ethylene-propylene copolymer and 2.2% by weight of ethylene having a density of 0.08 $g/cm^3$.

Melting point 147° C., MFI (230° C., 2.16 kg)=7.5 g/10 min, layer thickness=70 mm.

Layer d)

As layer b, but with a layer thickness of 0.5 mm.

Layer e)

Homopolypropylene

Melting point 163° C., MFI (230° C., 2.16 kg)=70 g/10 min, reinforced with 25% by weight of glass mats (random-laid glass fibers) and 25% by weight of glass fibers, oriented in the longitudinal direction. Layer thickness=8 mm.

Layers a) and b) are produced as a composite by coextrusion and matched to the shape of the female mold by negative thermoforming at 175° C. Layer e) is produced by compression molding from a semifinished sheet; before pressing, layer d) is placed in the mold and in this way firmly bonded to layer e). The composite of e) and d) is perforated using a heated nail board in order to allow hot steam to flow into the mold.

The mold coated with composite layers a/b and d/c is closed, with the cavity having an internal diameter of 70 mm. The cavity is filled with foam particles having a bulk density of 0.08 $g/cm^3$, particle diameter 6 mm, from a storage tank under a pressure of 1.5 bar. Hot steam at 3.5 bar is then passed into the mold cavity for 8 seconds, and the mold is subsequently cooled using water. The mold is opened, and the composite part is demolded by means of an ejector.

EXAMPLE 2

Dashboard composite component

Layer a)

Mixture of

50% by weight of Novolen 2900 HX (BASF AG) which has partially crosslinked by heating with addition of 0.4% by weight of Ucarsil PC2A and 0.2% by weight of Ucarsil PClB (Union Carbide Corp.). MFI (230° C., 2.16 kg) =1.2 g/10 min.

20% by weight of VLDPE Norsoflex FW 1900 (Enichem)

10% by weight of random terpolymer comprising 92% by weight of propylene, 2% by weight of ethylene and 4% by weight of 1-butene 10% by weight of hydrogenated styrol-butadiene rubber Kiaton G1650 (Shell)

10% by weight of talc.

Melting point of the rigid phase 162° C.,

Layer thickness 1.1 mm.

Layer b)

As in Example 1, layer thickness 0.15 mm.

Layer c)

Foam made from a random ethylene-propylene containing 2.2% by weight of ethylene, density 0.045 g/cm$^3$.

Melting point 147° C.,

Layer thickness varying between 4 and 20 mm.

Layer d)

As for layer b).

Layer e)

Homopolypropylene, MFI (230° C., 2.16 kg) = 2.5 g/10 min.

Melting point 163° C., layer thickness 4 mm, filled with 40% by weight of talc.

Layer b) is applied by hot lamination to layer a) produced by calendering. The composite is matched to the shape of the mold walls by vacuum thermoforming.

A layer composite comprising d) and e) is produced by injection molding, layer d) being laid in and sucked against the cavity plate of the injection mold; the melt for layer e) is subsequently injected.

The mold containing composite layers a/b and d/e is closed until the cavity has an internal diameter 2 mm larger than the desired foam layer. The cavity is then filled with foam particles having a bulk density of 0.040 g/cm$^3$, particle diameter 3 mm, from a pressurized container under a pressure of 1.5 bar, the mold is closed and steam at 3.5 bar is passed into the cavity for 6 seconds. The mold is cooled using water and opened, and the molding is removed.

EXAMPLE 3

The procedure is similar to that of Example 2, but layer e) is a homopolypropylene layer, MFI (230° C., 2.16 kg) = 10 g/min, reinforced with 30% by weight of random-laid glass fiber mat and produced by compression molding.

We claim:

1. A shock-absorbing propylene polymer composite molding containing
   a. a layer with a thickness of from 0.5 to 10 mm which contains a propylene polymer having a melting point of from 130 to 165° C.,
   b. an intermediate layer with a thickness of from 0.05 to 0.5 mm comprising a hot-melt adhesive based on an olefin copolymer having a melting point of from 90 to 140° C.,
   c. a foam layer with a thickness of from 3 to 200 mm and a density of from 0.015 to 0.1 g/cm$^3$ based on a propylene copolymer having a melting point of from 125° to 155° C.,
   d. an intermediate layer with a thickness of from 0.05 to 0.5 mm comprising a hot-melt adhesive based on an olefin copolymer having a melting point of from 90° to 140° C.,
   e. a layer with a thickness of from 0.5 to 10 mm which contains a propylene polymer having a melting point of from 130° to 165° C.

2. A process for the production of a polypropylene composite molding as claimed in claim 1, which comprises, in a mold which does not close in a gas-tight manner, filling the space between layers a) and b) on the one hand and d) and e) on the other hand, which are matched to the shape of the mold walls, with particles of the foam c) having a mean diameter of from 2 to 8 mm, and heating the particles in this space by introducing steam or hot air in such a manner that they expand and weld to one another, and which comprises melting the intermediate layers b and d and simultaneously welding them to layers a, c and e.

* * * * *